United States Patent
Vale et al.

(10) Patent No.: US 7,463,270 B2
(45) Date of Patent: Dec. 9, 2008

(54) PHYSICAL-VIRTUAL INTERPOLATION

(75) Inventors: Peter O. Vale, Redmond, WA (US); Duncan, Camano Island, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 11/350,854

(22) Filed: Feb. 10, 2006

(65) Prior Publication Data

US 2007/0188444 A1    Aug. 16, 2007

(51) Int. Cl.
*G09G 5/00* (2006.01)
*H04N 1/36* (2006.01)
*H04N 1/04* (2006.01)
*H04N 1/46* (2006.01)
*G06K 9/00* (2006.01)

(52) U.S. Cl. .................. 345/619; 345/624; 345/156; 358/412; 358/474; 358/488; 358/505; 382/318; 715/700; 715/788; 715/799

(58) Field of Classification Search .............. 345/7, 345/156, 619–624, 629–630, 652, 606, 473–475; 715/700, 706, 726, 757, 788, 856, 798–799, 715/866; 358/500–506, 408–409, 412, 452, 358/471, 474, 486–488; 382/312, 318; 348/94–107
See application file for complete search history.

(56) References Cited

U.S. PATENT DOCUMENTS

| 5,423,554 A | 6/1995 | Davis |
| 6,159,100 A | 12/2000 | Smith |
| 6,522,431 B1 * | 2/2003 | Pitts et al. .................. 358/474 |
| 6,672,961 B1 | 1/2004 | Uzun |
| 6,759,979 B2 * | 7/2004 | Vashisth et al. ........ 342/357.13 |
| 6,767,287 B1 | 7/2004 | Mcquaid et al. |
| 6,963,075 B2 * | 11/2005 | Yamada et al. ......... 250/559.29 |
| 2002/0151337 A1 | 10/2002 | Yamashita et al. |
| 2002/0154214 A1 | 10/2002 | Scallie et al. |

(Continued)

FOREIGN PATENT DOCUMENTS

WO    WO0236225    5/2002

OTHER PUBLICATIONS

Wilson, PlayAnywhere: "A Compact Interactive Tabletop Projection-Vision System", 2005, ACM, pp. 83-92.*

(Continued)

*Primary Examiner*—Sajous Wesner
(74) *Attorney, Agent, or Firm*—Workman Nydegger

(57) ABSTRACT

A display system and method for use in controlling movement of a virtual image version of a physical object is described. A physical object may be placed on or near a display surface, which may sense the presence of the object and display a virtual image version of the object. In response to movement of the physical object, the virtual image may move as well. Movement speed of the virtual image may be capped at a maximum speed, so that if the physical object is moved too quickly, the image will remain moving at a constant maximum speed. Movement effects, such as blurring, fading, animation, etc. may be applied to the image during the movement. The movement may change direction as the physical object is detected in different positions, and the movement effects may be applied to smooth the change in direction (e.g., curving trajectory).

20 Claims, 8 Drawing Sheets

U.S. PATENT DOCUMENTS

| | | |
|---|---|---|
| 2003/0063132 A1 | 4/2003 | Sauer et al. |
| 2003/0119576 A1 | 6/2003 | McClintock et al. |
| 2004/0075196 A1* | 4/2004 | Leyden et al. ............... 264/401 |
| 2004/0127272 A1 | 7/2004 | Park et al. |
| 2005/0069188 A1 | 3/2005 | Rubbert et al. |
| 2005/0177054 A1 | 8/2005 | Yi et al. |
| 2005/0193120 A1 | 9/2005 | Taylor |
| 2005/0248729 A1 | 11/2005 | Drucker et al. |
| 2005/0251800 A1 | 11/2005 | Kurlander et al. |
| 2005/0253872 A1 | 11/2005 | Goss et al. |
| 2005/0280631 A1 | 12/2005 | Wong et al. |

OTHER PUBLICATIONS

Lee et al., "*Modeling Virtual Object Behavior within Virtual Environment*", Virtual Reality Laboratory, Dept. of Computer Science and Engineering, pp. 41-48.

Nikitin et al., *Real-time simulation of elastic objects in Virtual Environments using finite element method and precomputed Green's functions*.

*TouchTable*™, Northrop Grumman, www.northropgrumman.com.

*TouchTable*™, Northrop Grumman, http://www.ms.northropgrumman.com/touchtable/index.html.

* cited by examiner

| MOVEMENT | EFFECT(S) |
|---|---|
| POINT A TO POINT B | STRAIGHT, SLOW |
| POINT B TO POINT C | CURVY, FAST |
| POINT C TO POINT D | STRAIGHT, SLOW, BLUR |
| POINT D TO POINT E | STRAIGHT, SLOW, STRETCH |

PHYSICAL-VIRTUAL INTERPOLATION

BACKGROUND

The basic concept of virtual reality has been written about in science fiction novels for years, but the actual implementation of that concept is a work in progress. As the basic concept goes, a user may experience a virtual world that is simulated using one or more computers. The user may wear special goggles to view a computer-generated image representing a view of a virtual environment, and the user may interact with the environment by, for example, reaching out with a hand to "move" a displayed object. In real life, the user's moving hand may be holding a special controller, or may be wearing a glove that is detectable by the computer, while in the computer-generated image of the virtual world, a displayed hand might move as well.

In such a virtual world, the displayed image displays movement corresponding to the movement of the user's hand. However, technical limitations may hamper virtual experiences. For example, if the computer system is able to detect the user's hand position once every second, then very rapid movements of the user's hand may result in jarring displays in the computer-generated image, where the virtual hand may appear to jump around on the screen. It would be an advance in the art if such rapid movements could be intelligently interpolated in the virtual environment to present a less jarring experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One or more physical objects may be placed on or near a display surface (e.g., an object resting on top of a horizontal table-top display), and the display surface may detect this and display a corresponding virtual image version of the object. The virtual version may resemble the object and share common appearance characteristics (e.g., structural features, colors, shapes, etc.), and may appear directly underneath the corresponding physical object, or at an offset. The virtual image version may be displayed at an offset from the position of the physical object, for example, to allow a user to view the image without having the object in the way.

The display, or associated components, may periodically scan the surface to detect the current position of the physical objects, and may move the virtual image version accordingly. That movement of the virtual image version may correspond to the movement of the physical object, but a maximum speed may be imposed to prevent the image from moving too fast if the physical object is moved at high speed.

The system may periodically scan the display surface to identify current position of physical objects. The scanning rate can be the fastest possible using the hardware, or it could be a slower rate established as a user-configured parameter or a software parameter.

The system may modify an appearance of the virtual image during the movement. For example, an animation effect may be used. A fading, transparency, color adjustment, or other effect may also be used. Furthermore, the path taken between points during the movement need not be a straight line, and can be a curve or some other desired path.

The virtual image may continue movement beyond a known position of the physical object until a new position is sensed, and upon sensing a new position, the movement may be corrected to head towards the new position. This correction may include its own movement effect (e.g., a curved trajectory) to smooth the appearance of the movement.

The system may retain a series of waypoints corresponding to sensed positions of the physical object as it is moved across the display, and the virtual image version may take a path passing though those waypoints in its movement.

These and other features will be described in greater detail below.

BRIEF DESCRIPTION OF THE DRAWINGS

FIG. 8 illustrates an example of the contents of a data structure table for use in movement.

DETAILED DESCRIPTION

Figure 1:
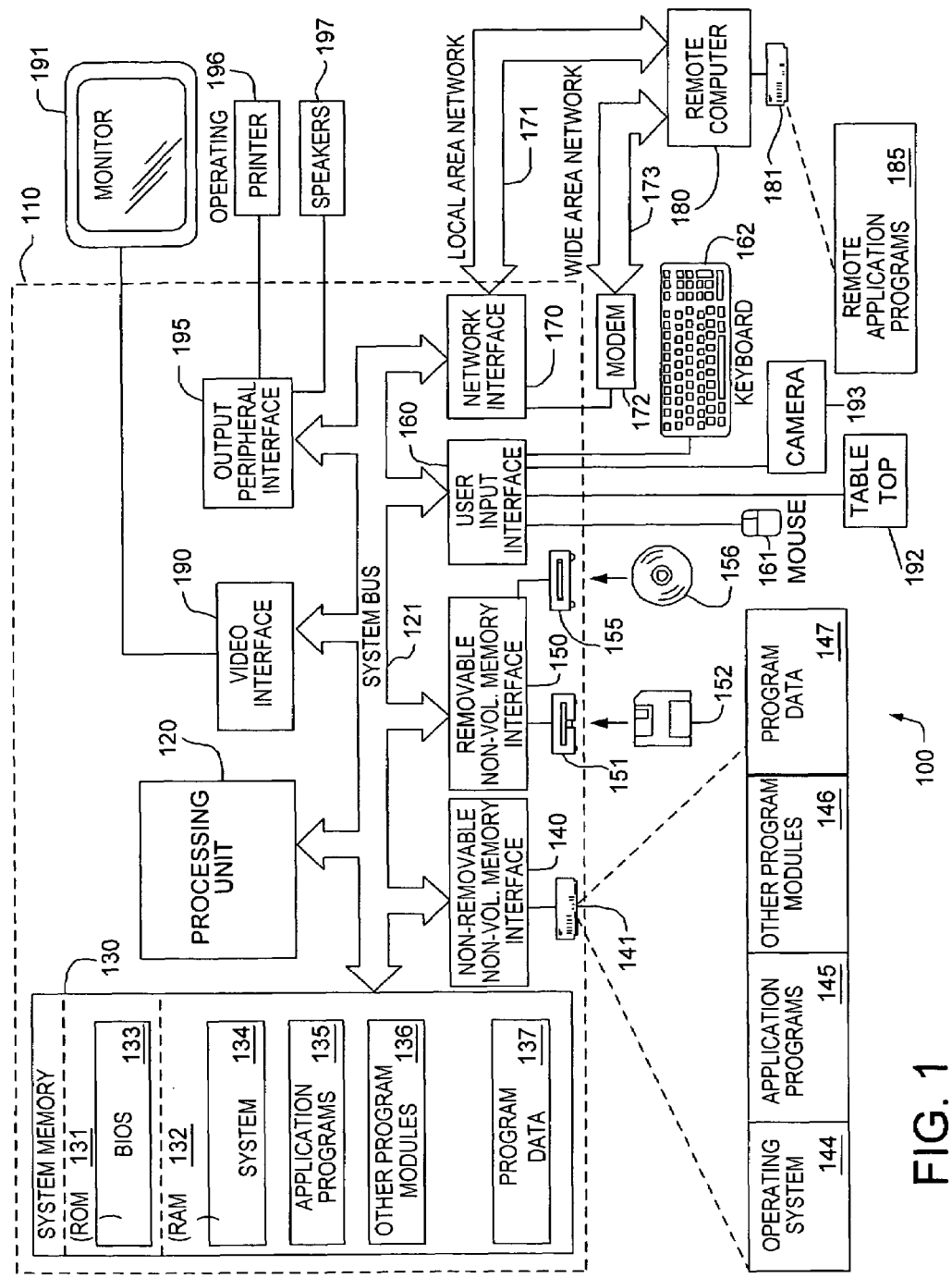
FIG. 1 illustrates an example of a computing system environment.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. The video interface 190 may be bidirectional, and may receive video input from sensors associated with the monitor 191. For example, the monitor 191 may be touch and/or proximity sensitive, such that contacts to a monitor surface may be used as input data. The input sensors for affecting this could be a capacitive touch sensitive device, an array of resistive contact sensors, an optical sensor or camera, or any other desired sensor to make the monitor 191 touch and/or proximity sensitive. In an alternative arrangement, or in addition, a touch and/or proximity sensitive input system may be separate from monitor 191, and may include a planar surface such as a table top 192 and any applicable sensing systems to make the planar surface touch sensitive, such as camera 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
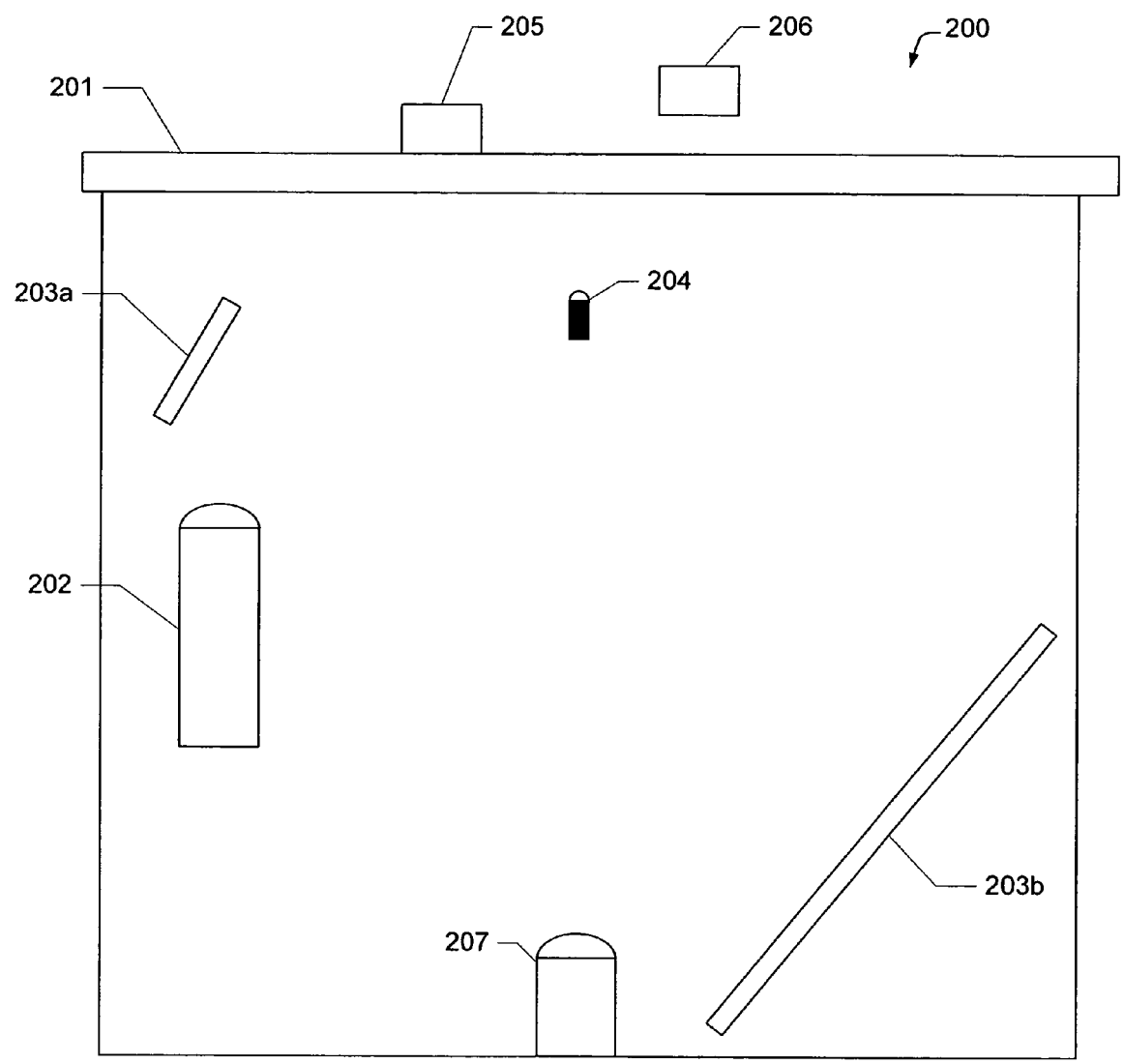
FIG. 2 illustrates an interactive table environment and interface.

The computing device shown in FIG. 1 may be incorporated into a system having table display device 200, as shown in FIG. 2. The display device 200 may include a display surface 201, which may be a planar surface such as a table top. As described hereinafter, the display surface 201 may also help to serve as a user interface.

The display device 200 may display a computer-generated image on its display surface 201, which allows the device 200 to be used as a display monitor for computing processes, displaying television or other visual images, video games, and the like. The display may be projection-based, and may use a digital light processing (DLP) technique, or it may be based on other display technologies, such as liquid crystal display (LCD) technology. A projector 202 may be used to project light onto the underside of the display surface 201. It may do so directly, or may do so using one or more mirrors. As shown in FIG. 2, the projector 202 projects light for a desired image onto a first reflective surface 203a, which may in turn reflect light onto a second reflective surface 203b, which may ultimately reflect that light onto the underside of the display surface 201, causing the surface 201 to emit light corresponding to the desired display.

In addition to being used as an output display for displaying images, the device 200 may also be used as an input-receiving device. As illustrated in FIG. 2, the device 200 may include one or more light emitting devices 204, such as IR light emitting diodes (LEDs), mounted in the device's interior. The light from devices 204 may be projected upwards through the display surface 201, and may reflect off of various objects that are above the display surface 201. For example, one or more objects 205 may be placed in physical contact with the display surface 201. One or more other objects 206 may be placed near the display surface 201, but not in physical contact (e.g., closely hovering). The light emitted from the emitting device(s) 204 may reflect off of these objects, and may be detected by a camera 207, which may be an IR camera if IR light is used. The signals from the camera 207 may then be forwarded to a computing device (e.g., the device shown in FIG. 1) for processing, which, based on various configurations for various applications, may identify the object and its orientation (e.g. touching or hovering, tilted, partially touching, etc.) based on its shape and the amount/type of light reflected. To assist in identifying the objects 205, 206, the objects may include a reflective pattern, such as a bar code, on their lower surface. To assist in differentiating objects in contact 205 from hovering objects 206, the display surface 201 may include a translucent layer that diffuses emitted light. Based on the amount of light reflected back to the camera 207 through this layer, the associated processing system may determine whether an object is touching the surface 201, and if the object is not touching, a distance between the object and the surface 201. Accordingly, various physical objects (e.g., fingers, elbows, hands, stylus pens, blocks, etc.) may be used as physical control members, providing input to the device 200 (or to an associated computing device).

The device 200 shown in FIG. 2 is illustrated as using light projection- and sensing techniques for the display of data and the reception of input, but other techniques may be used as well. For example, stylus-sensitive displays are currently available for use with Tablet-based laptop computers, and such displays may be used as device 200. Additionally, stylus- and touch-sensitive displays are available with many personal data assistants (PDAs), and those types of displays may also be used as device 200.

The device 200 is also shown in a substantially horizontal orientation, with the display surface 201 acting as a tabletop. Other orientations may also be used. For example, the device 200 may be oriented to project a display onto any desired surface, such as a vertical wall. Reflective IR light may also be received from any such oriented surface.

Figure 4:
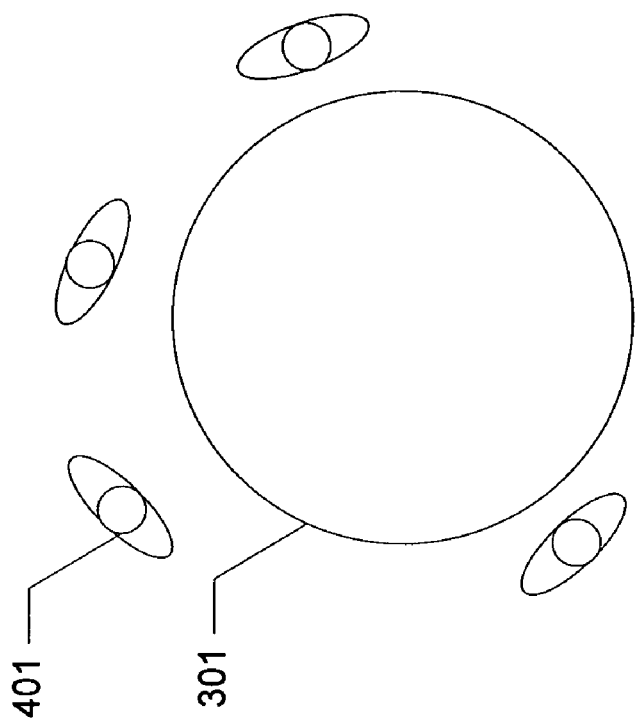
FIG. 4 illustrates a top view of the display from FIG. 3.
Figure 3:
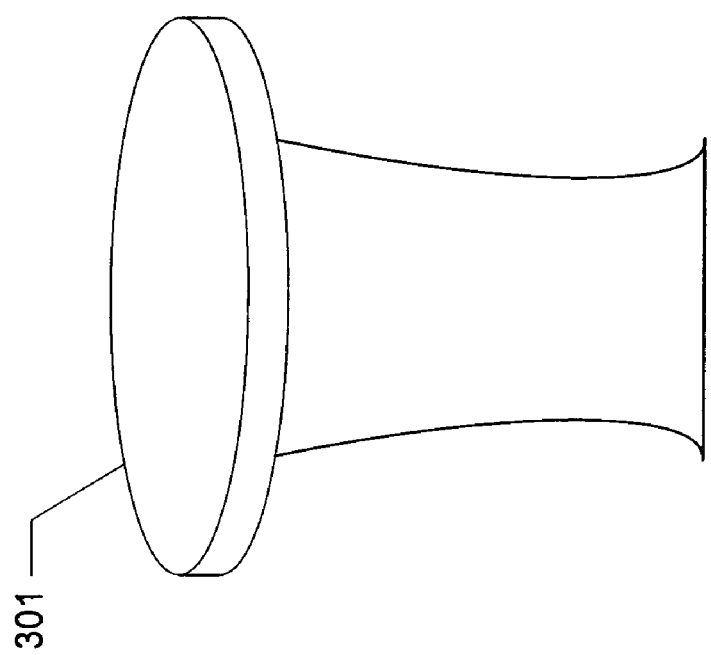
FIG. 3 illustrates an example of an interactive display.

FIG. 3 illustrates an illustrative configuration of an implementation of the system shown in FIG. 2, in which device 301 is used as a tabletop display device. FIG. 4 illustrates an overhead view of such a table, around which a number of users 401 may be seated or standing. Each user 401 may wish to interact with the display on the surface of table 301, for example to place and/or touch an object, or to play a party video game.

Figure 5:
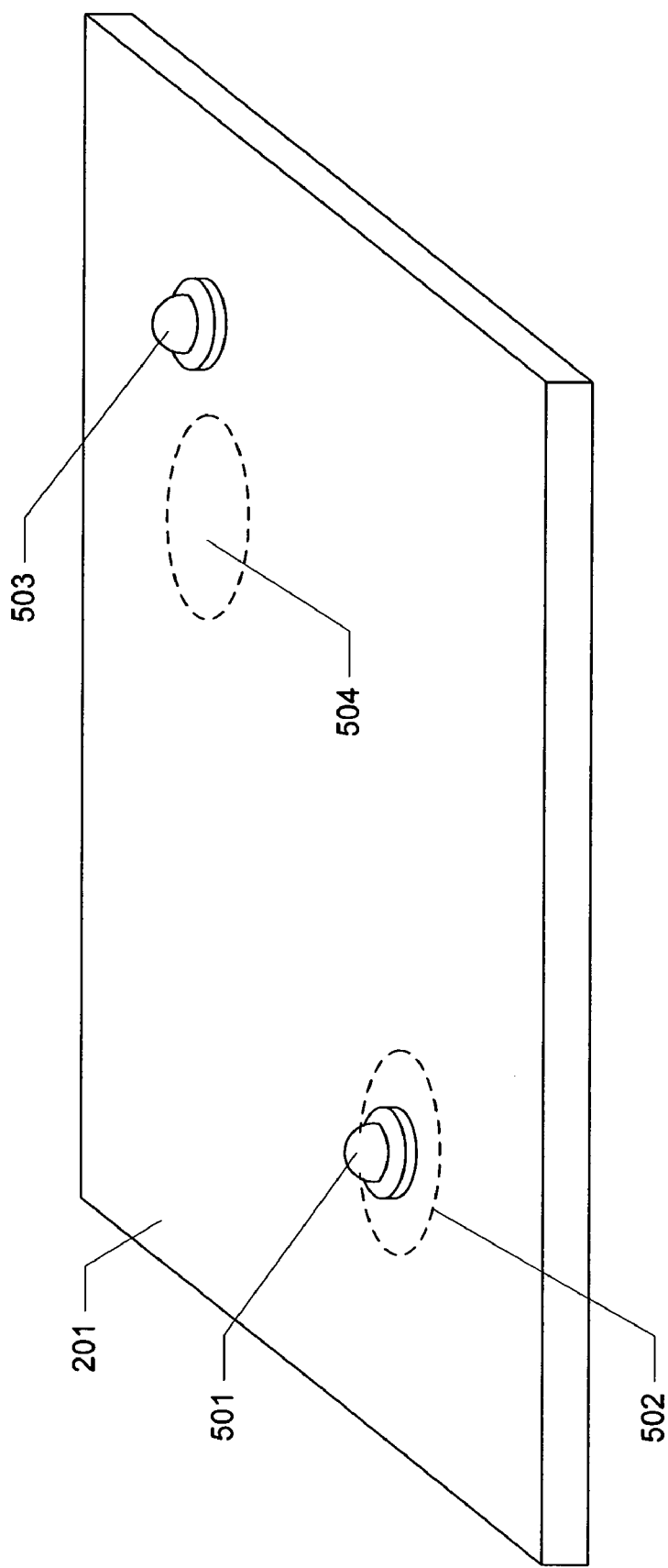
FIG. 5 illustrates an example display surface having a physical object and corresponding virtual version image.

FIG. 5 illustrates an example implementation, where a display surface 201 is used to provide a user with a display. The display may involve one or more physical pieces 501. Physical pieces 501 may be any type of object that the display 201 can detect. For example, pieces 501 may be wooden chess pieces, a plastic replica of a television remote control (or an actual remote control), a game piece resembling a controllable character of a game (e.g., a tennis player), etc. When placed on the display surface 201, an image 502 may be displayed to correspond with the physical piece 501. The displayed image 502 may be a virtual representation of the physical piece 501, and may graphically share visual features. For example, if piece 501 is a queen chess piece having a crown and robe, the image 502 may display an image of a woman having a crown and robe. If the physical piece 501 is a tennis player, the image 502 may include the same clothing, or equipment (e.g., racquet), or facial features as the physical piece 501. If the physical piece 501 represents a television remote control, the image 502 may display the same control buttons and control input options available through a remote control.

The location of the displayed image 502 may be synchronized with the placement of the piece 501 relative to the display 201. For example, in FIG. 5, the image 502 is shown as appearing directly underneath the location of the physical piece. Other predetermined orientations may be used as well, such as having the image 502 appear offset from the physical piece 501 in a predetermined direction (e.g., appearing to the left of the piece 501, to the right, above, at a predetermined radial degree, such as 35 degrees, from the physical piece, etc.), and by a predetermined distance (e.g., appearing one centimeter away, two inches away, etc.). As shown in FIG. 5, a second object 503 may have an associated image 504 located offset to a side (e.g., to the left), and separated by a distance (e.g., one inch). Different offsets may be desirable when portions of the image 502 need to be seen by the user. For example, if the physical piece 501 and image 502 are of a television remote control (or other electronic device), the image 502 may include input-sensitive keys resembling the buttons on a remote control, and the user may wish to have access to those displayed buttons in order to use them. To accommodate that, the displayed image 502 may automatically be offset from the physical piece 501 by a larger distance, so that the physical piece 501 does not obscure predetermined areas of the image 502.

Figure 6A:
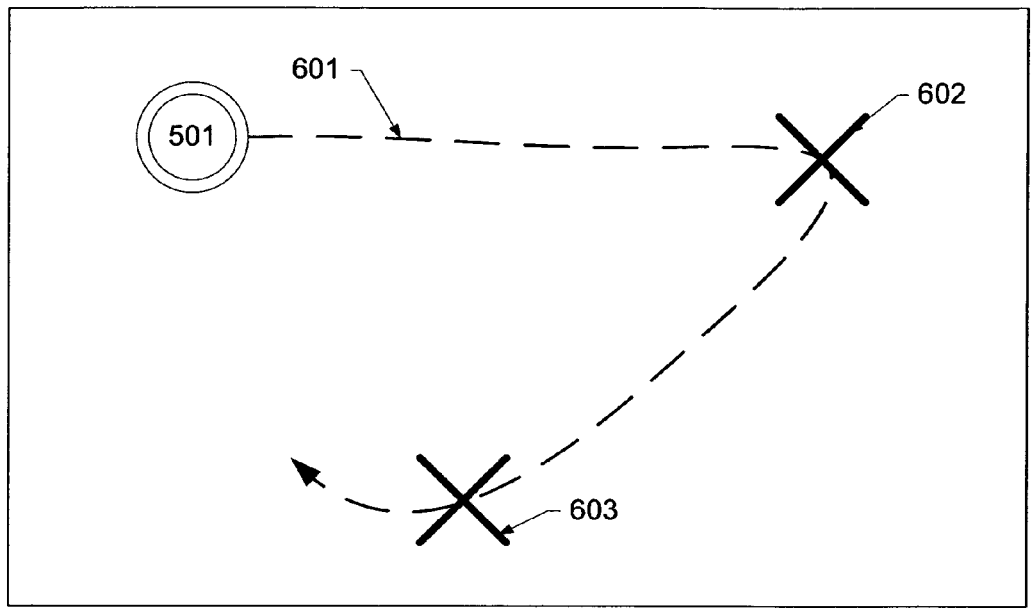
FIGS. 6*a-c* illustrate example displays of movement characteristics based on movement of a physical object.

Movement of the physical piece 501 on (or near) the display 201 may present the system with the question of how that movement should be represented by the virtual version of the piece, or image 502. FIG. 6a illustrates a top view of display 201 to show an example of such movement. As shown in that figure, physical piece 501 may be moved along a path 601 on the display 201, such that the piece 501 passes through points 602 and 603. The piece 501 may be in contact with the display 201 during this movement, hovering over display 201 during the movement, or a combination of the two.

The display 201 may detect the position of the physical piece 501 during this movement. However, the display 201, and its underlying processing components, may only be able to scan the display surface 201 periodically to detect objects on or near its surface. For example, the display 201 may only be able to detect the piece 501's position at a predetermined scanning period, such as once every 10 milliseconds, 100 milliseconds, second, etc. If the user moves the piece 501 at a fast enough rate, the display 201 system may end up detecting individual positions of the piece along the path 601, as opposed to every point along the path. So, for example, the display 201 system may detect the piece 501 once when it is at point 602, and then again in the next scan (or a later scan, if one or more scans are desired to occur between point 602 and 603) when the piece is at point 603.

Additionally, the system may require an object to pause at a particular location for a predetermined period before registering the new location for movement. For example, a program on the system may wish to minimize processing by only registering movement if the object is at a new location for longer than 2, 5, 10, 20 etc. scans. If an object is at a location for fewer than that, the system may assume that the object is still in motion and has not yet defined the next point for movement. This approach may be useful, for example, in waypoint-based systems, as described further below.

To display movement of the virtual image 502 between two points, the computing system may define a number of movement characteristics. One such characteristic may be the movement speed. The display 201 system, or software executing on the system, may wish to limit the speed of the displayed image 502 to a predetermined speed, such as 1 inch per second. Limiting the speed may help give the virtual object some "weight" or "inertia," and may also help game software present a more enjoyable experience. For example, if the physical piece 501 is intended to represent a tennis player, then the maximum speed of the virtual player image 502 may be limited based on the player character's individual speed (e.g., faster players may run fast, slower players may run slow, but no players run at superhuman speeds). In some situations, player accuracy in positioning an image corresponding to an object may actually be helped if the system does not always move the image at the same speed as the physical object (e.g., some players may unwittingly jerk the object 501 during a fast-paced game, not intending the object to speed off in the new direction). The maximum speed may be a software parameter, and may be a user-configured preference (e.g., John does not wish to see the object move faster than the limit). Additionally, although the example above refers to a game program (tennis), the features described herein may be used for any variety of applications in addition to games.

The speed need not be a constant value. For example, the speed of an object may vary with distance—e.g., it may be set to a higher value when the object is farther away from a desired end point, and the speed may be set to a lower value when the object nears the desired end point (e.g., the object may slow down as it approaches the endpoint). For example, the movement may be defined such that it occurs in a series of steps, with each step being half the distance to the endpoint (a minimum step value may be defined to ensure that the image will indeed eventually reach the destination). The speed may also vary depending on user input. For example, a user gesture made with the physical piece 501 (e.g., tapping the display 201, lifting the object 501 from the display for a predetermined period of time, pressing a button, etc.) may indicate a predetermined speed.

Figure 6B:
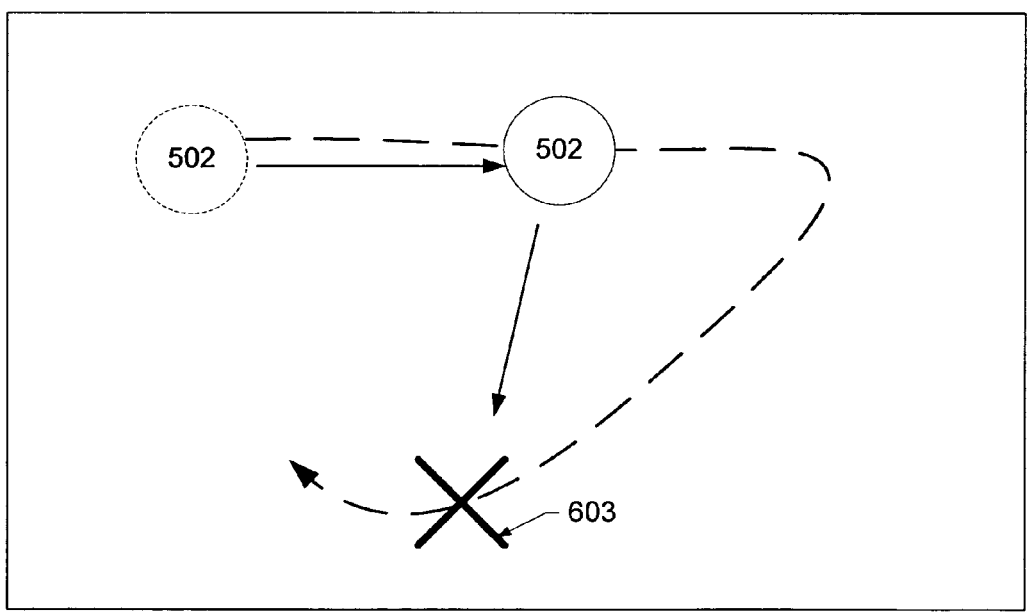

In some implementations, the system may establish a predetermined speed value based on the known scanning period that will be used. So, for example, if the system will be scanning once every second, the system may set a maximum speed so that the object 502 cannot move more than a predetermined distance in that one second (e.g., only moving 3 inches per second). So, as shown in FIGS. 6a and 6b, if the user moves the piece 501 to point 602 faster than this speed, the virtual image 502 might only have moved as far as the position shown in FIG. 6b. If the system then detects the object at position 603 at the next scanning, the system may recalculate its movement to move the image 502 from its current position to the new position at 603. In this manner, the image 502 may dynamically follow the user's movement of the physical object 501, but at a limited speed. This dynamic following may involve changes in direction of the image 502 as a new position is detected, and to smooth the presentation, an animation effect may be used for this change in direction. For example, a curved trajectory may be used to change the direction.

Figure 6C:
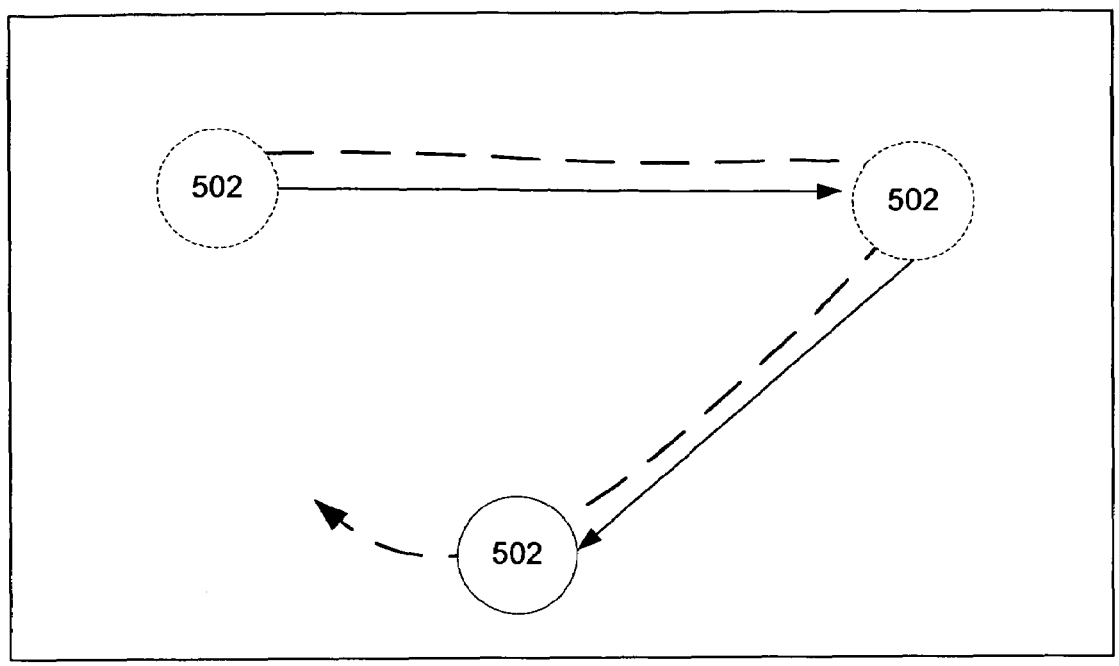

As an alternative, and as shown in FIGS. 6a and 6c, the system may capture waypoints at each scan, recording them as coordinate data in a memory, and may cause the image 502 to pass from waypoint to waypoint as it moves. So, as shown in FIG. 6c, the image 502 would pass through where point 602 was, and then on to where point 603 was, in moving along path 601.

The movement described above includes speed and path characteristics. Other movement characteristics may also be used. For example, another characteristic may be the path taken between points. If the display 201 system determines that the image 502 needs to move from point A to point B, the path may simply be a straight line. Alternatively, the path characteristic may define (e.g., via predetermined equations, codes, etc.) an alternate path type, such as a curvy path, a spiral, etc. Any desired movement path may be used.

Another characteristic may affect the appearance of the image 502. Such effects may include an animation during the motion. For example, a moving tennis player image may be animated to walk (or run) along the path. Another effect may involve blurring the object while it is in motion, and stopping the blurring (e.g., bringing the object back into focus) when the object comes to a rest or slows down. Another effect may involve fading the object to a lighter shade, color and/or brightness, or greater degree of transparency, and removing the fading effect when the object arrives at its new position. If desired, the object may completely disappear during the movement as a result of this fading, and upon arriving at its new position, the object may remain faded until the passage of a predetermined amount of time (e.g., 1 second), depending on the desired effect.

Another effect may involve stretching the object from a first position to a second position. The stretching may include "snapping" the image into place at the second position. For example, an object moving from a first position to a second position may extend from the first position towards the second one at a first speed, and upon stretching to the second position, the object may then quickly shrink from the first position towards the second position, at a second rate of speed greater than the first. As another effect, a trail or streak may be left behind the image 502 as it moves. The trail or streak may include, for example, duplicate versions of the original image 502 at prior locations along the path of movement.

Figure 7:
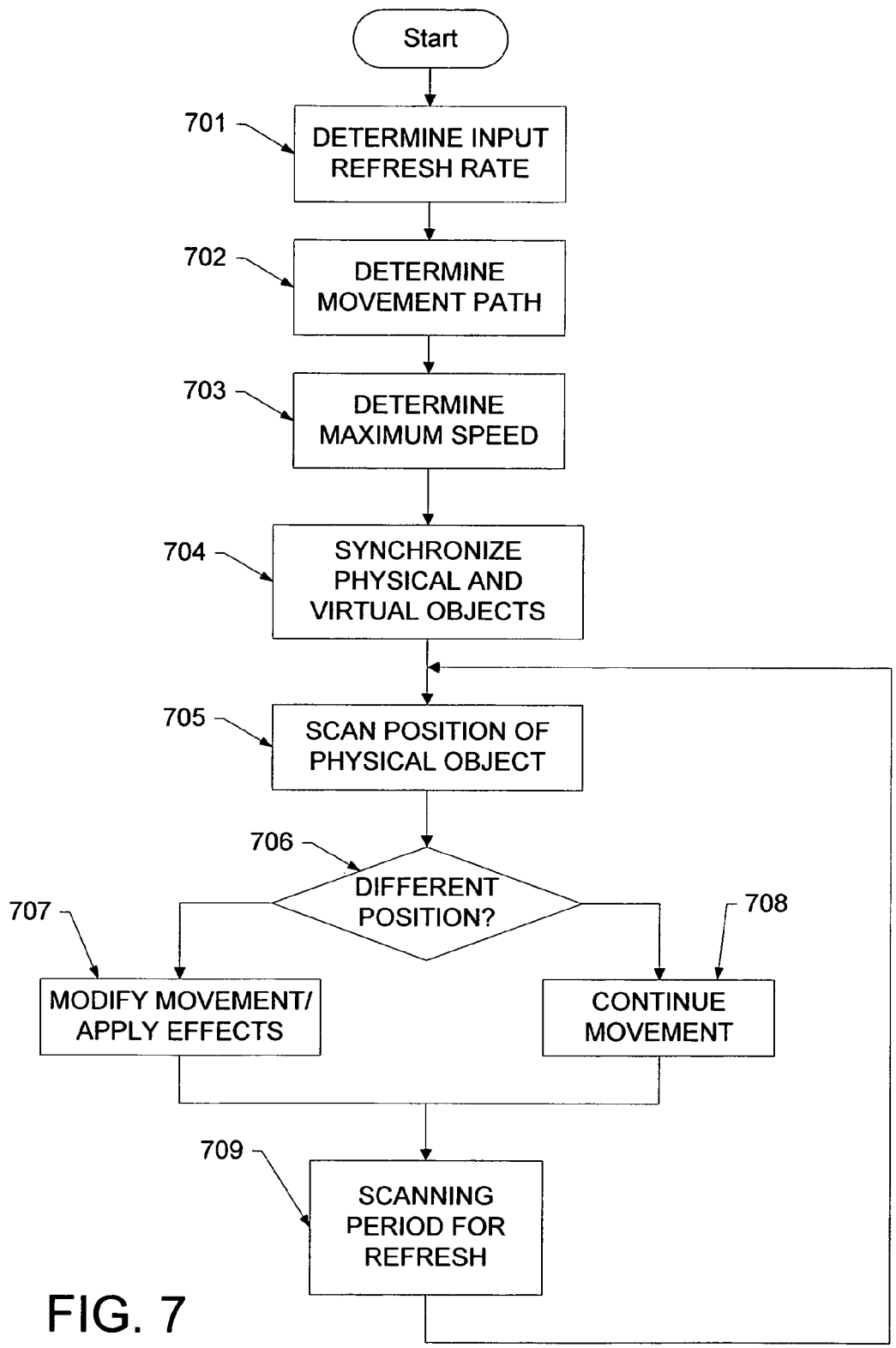
FIG. 7 illustrates an example process for implementing various features described herein.

FIG. 7 illustrates an example process by which the various features described herein may be implemented. At step 701, the input refresh rate may be determined. This rate may be the fastest scanning rate that the display 201, and its associated processing components, is capable of handling. Alternatively, the scanning period need not be hardware based, and may alternatively be configured by a user as a preference (e.g., John only wishes his system to track the position of an object once per 2 seconds, because the object is not likely to be moved very much—e.g., a television remote control, for example), or by software parameter or application setting (e.g., a particular video game wishes to force players to slow their movements down by only scanning every 5 seconds). This scanning period may be used in determining the movement path and speed characteristics discussed below.

In step 702, the movement path may be defined. The path may be any desired path that is to be taken when an image needs to move from a first point to a second point. As noted above, the path may be linear, and may be a straight line between the points. Other types of paths may be defined as well, such as an arcing path, curving path, sinusoidal path, etc. Different paths may be defined for different conditions, such as the scanning period mentioned above, or other use conditions implemented in software.

In step 703, the maximum movement speed may be defined. The maximum speed may be, for example, one inch per second, 400 pixels per second, etc. Multiple speeds may be defined for different conditions, types of objects, user inputs, etc. The maximum speed may also be defined based on the scanning period mentioned above, or other use conditions implemented in software.

In step 704, a physical object 501 on (or near) the display 201 may be synchronized with its virtual representation image 502. This may occur, for example, upon startup of the system, or on starting a particular piece of software (e.g., a tennis video game). The synchronization may include detecting the initial placement of the object 501, and displaying the image 502 on the display 201 underneath the object 501, or at the predefined offset from the object 501 (if an offset is desired). As noted above, detecting the object's position may be done in a variety of ways based on the underlying hardware, and may include, for example, using an infrared light source 204 to illuminate an object 501, and to use an infrared camera 207 to detect a pattern in the infrared light reflected off of the object (or off of a reflective pattern on the object), and to identify the current location of the object with respect to the display 201. This location may be expressed in terms of coordinates on the surface of display 201, and may include a height value if the object 501 is suspended above (e.g., hovering over) the surface of display 201.

Step 705 begins a repetitive looping process that may run the entire course of the system (or software) execution. At step 705, the current location of the physical object 501 is detected using the display 201 and its supporting components, in the manner described above.

In step 706, the current location of the object 501 is compared with the previous known location of the object to determine whether the object 501 has moved. If it has moved, the process may proceed to step 707 to modify movement characteristics and apply movement effects, based on the predefined characteristics described above. For example, the system may adjust the direction of movement of the image 502 so that it moves towards the new position of the physical object 501. A different path may be defined for this adjusted movement, and various effects (e.g., blurring, fading, etc.) may be applied.

If, in step 706, it is determined that the object 501 has not moved, then the process may proceed to step 708 and maintain whatever movement image 502 had been experiencing prior to the most recent scanning in step 705. For example, if image 502 was standing still, then it will continue standing still. If the image 502 was moving from a previous location (which may occur, for example, if the user had previously moved the object 501 faster than the set maximum speed for the corresponding image 502, and the image 502 was in the process of "catching up" to the now-still object 501), the image 502 may continue its movement.

In step 709, the process may await the passage of a predetermined period of time until the next scanning is to occur. As noted above, the amount of time between scans may be software configured (and/or user configured), and step 709 may be used to accommodate such periods. If, however, the system is configured to scan as fast as the hardware will allow, then step 709 may be skipped, with the process immediately proceeding back to step 705 to conduct another scan for the location of the physical object 501.

The discussion above notes that an image 502 may have movement characteristics. The system may store in memory a data structure to identify how an image 502 is currently supposed to move. FIG. 8 illustrates an example of how such a structure may be arranged. The structure may store a table 801 identifying movement endpoints/destinations with characteristics to be applied. For example, the structure may store an identification that an image 502 is to move from a first location (e.g., "Point A") to a second location (e.g., "Point B") on the display 201. In some implementations, the table 801 might only need to store one destination, the end point of the current movement. The table 801 may identify one or more characteristics for this movement. For example, the movement from Point A to Point B may be in a straight path at a slow speed. As noted above, these characteristics may be defined by the system, such as in steps 702, 703, and they may also be defined by user input, such as a gesture made with the corresponding physical object 501, or some other user input.

In some implementations, such as that shown in FIG. 6*b*, the image 502 dynamically moves towards the most recent position of the physical object 501. For such implementations, the table 801 need only store information for one endpoint—the last location of the object 501. In other implementations, such as that shown in FIG. 6*c*, the image 502 may move through the various prior positions of the object 501, more closely following the path taken by the object. For those implementations, table 801 may store multiple end points (or, in this case, "waypoints") and movement characteristics for the various endpoints. For example, step 707 in the FIG. 7 example process may add information to the table 801 indicating that, after arriving at Point B, the image 502 is then to move from Point B to Point C, with a different set of movement characteristics (e.g., a curvy path this time, and at a fast speed) for that "leg" of the journey. Other movement effects may be applied as well, such as a blurring or stretching effect, as illustrated in the movement to Points D and E illustrated in the FIG. 8 example.

Using one or more of the features and approaches described above, a user's experience with changing desktop orientations can be improved. Although the description above provides illustrative examples and sequences of actions, it should be understood that the various examples and sequences may be rearranged, divided, combined and subcombined as desired. Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim the following:

1. One or more computer-readable storage media, storing one or more computer-executable instructions for performing the following steps:

performing a first scanning to detect the location of a physical object with respect to a display surface;

initially displaying, on the display surface, an image as a virtual representation of said object based on the first scanning;

subsequently performing a second scanning to detect the location of the physical object with respect to the display surface;

identifying a difference in position of the physical object in the first and second scans;

moving the image from a first location towards a second location, the first and second locations corresponding to positions of the object during said first and second scans, respectively; and limiting a speed of motion of the image during the moving step to a maximum speed.

2. The one or more computer-readable storage media of claim 1, wherein said display surface is a horizontal surface, and said physical object is on top of said surface.

3. The one or more computer-readable storage media of claim 1, wherein said first and second scannings are performed periodically according to a user-configured scanning period.

4. The one or more computer-readable storage media of claim 1, wherein said step of initially displaying places said image at a location on said surface that is offset from said physical object.

5. The one or more computer-readable storage media of claim 4, wherein said offset includes a directional offset and a distance offset from a position underneath said physical object.

6. The one or more computer-readable storage media of claim 1, wherein said scans are separated by at least one intermediate scan.

7. The one or more computer-readable storage media of claim 1, further including computer executable instructions for modifying an appearance of said image during said moving.

8. The one or more computer-readable storage media of claim 7, wherein said modification of said appearance includes an animation effect.

9. The one or more computer-readable storage media of claim 7, wherein said modification of said appearance includes a fading effect.

10. The one or more computer-readable storage media of claim 9, wherein said fading effect includes adjusting a transparency value of said image.

11. The one or more computer-readable storage media of claim 1, wherein said moving between said first and second locations is along a predetermined path other than a straight line between the first and second locations.

12. The one or more computer-readable storage media of claim 1, wherein a speed of said moving varies based on a distance between said image and said second location.

13. The one or more computer-readable storage media of claim 1, wherein said maximum speed is a user-configured software setting.

14. The one or more computer-readable storage media of claim 1, wherein said moving dynamically adjusts to move towards the object's current position as new scans are performed.

15. The one or more computer-readable storage media of claim 14, wherein during said dynamic adjustment, a transition animation is used for a change in direction.

16. The one or more computer-readable storage media of claim 1, further comprising computer-executable instructions for maintaining a data structure of waypoints for said moving, said waypoints being established by position of said object during said periodic scanning.

17. A visual interpolation method on a computer processing system having a display, comprising the steps of:
storing a predetermined maximum speed for moving a displayed image across a display;
detecting, by said computer processing system, first and second positions of a physical object as it is moved in relation to said display;
moving, across said display, a displayed image corresponding to said physical object in a direction based on said first and second positions, wherein
when said physical object is moved at a speed below said predetermined maximum speed, said moving of said displayed image occurs at a speed corresponding to said speed of said physical object; and
when said physical object is moved at a speed above said predetermined maximum speed, said moving of said displayed image occurs at said predetermined maximum speed, said maximum speed being lower than said speed of said physical object.

18. The method of claim 17, further comprising the step of adding a plurality of waypoints to a movement path of said image based on positions of said physical object detected as it is moved in relation to said display.

19. The method of claim 17, further comprising the step of applying a movement effect to said image during said moving.

20. A computing device, comprising:
one or more processors and one or more memories;
a horizontal display surface, coupled to one or more of said processors, and configured to display a computer-generated image; and
a camera configured to detect the presence of a physical object in relation to said display surface, wherein said one or more memories stores computer-executable instructions for causing said one or more processors to:
detect the presence of said physical object;
display a virtual image version of said physical object on said display surface; and
move said virtual image version of said physical object in response to movement of said physical object, wherein said movement corresponds to movement of said physical object until a maximum speed is reached by said image, at which time said movement remains at said maximum speed even if said physical object is moved at a faster speed.

* * * * *